US011310550B2

(12) United States Patent
Chung et al.

(10) Patent No.: US 11,310,550 B2
(45) Date of Patent: *Apr. 19, 2022

(54) SYSTEM AND METHOD FOR STORING MULTIMEDIA FILES USING AN ARCHIVE FILE FORMAT

(71) Applicant: TIVO CORPORATION, San Jose, CA (US)

(72) Inventors: Do Hyun Chung, San Ramon, CA (US); Ren L. Long, Emeryville, CA (US); Dan Dennedy, Castro Valley, CA (US)

(73) Assignee: TIVO CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,792

(22) Filed: May 11, 2020

(65) Prior Publication Data

US 2021/0409801 A1    Dec. 30, 2021

Related U.S. Application Data

(63) Continuation of application No. 16/434,110, filed on Jun. 6, 2019, now abandoned, which is a continuation
(Continued)

(51) Int. Cl.
*H04N 21/4147* (2011.01)
*H04N 21/433* (2011.01)
(Continued)

(52) U.S. Cl.
CPC ..... *H04N 21/4147* (2013.01); *H04L 67/1097* (2013.01); *H04N 21/23113* (2013.01);
(Continued)

(58) Field of Classification Search
None
See application file for complete search history.

(56) References Cited

U.S. PATENT DOCUMENTS 6,675,382 B1    1/2004    Foster
7,461,262 B1    12/2008   Otoole
(Continued)

OTHER PUBLICATIONS

U.S. Appl. No. 16/434,110, USPTO e-Office Action: EXIN—Examiner Interview Summary Record (Ptol-413), dated Dec. 17, 2019, 2 pgs.
(Continued)

*Primary Examiner* — Alexander Q Huerta
(74) *Attorney, Agent, or Firm* — Haley Guiliano LLP

(57) ABSTRACT

Techniques and mechanisms described herein facilitate the storage of digital media recordings. According to various embodiments, a system is provided comprising a processor, a storage device, Random Access Memory (RAM), an archive writer, and a recording writer. The archive writer is configured to retrieve a plurality of small multimedia segments (SMSs) in RAM and write the plurality of SMSs into an archive container file in RAM. The single archive container file may correspond to a singular multimedia file when complete. New SMSs retrieved from RAM are appended into the archive container file if the new SMSs also correspond to the singular multimedia file. The recording writer is configured to flush the archive container file to be stored as a digital media recording on the storage device once enough SMSs have been appended by the archive writer to the archive container file to complete the singular multimedia file.

20 Claims, 13 Drawing Sheets

Related U.S. Application Data of application No. 15/685,971, filed on Aug. 24, 2017, now Pat. No. 10,349,108.

(51) Int. Cl.

| | | |
|---|---|---|
| *H04L 67/1097* | (2022.01) | |
| *H04N 21/231* | (2011.01) | |
| *H04N 21/2747* | (2011.01) | |
| *H04N 21/845* | (2011.01) | |
| *H04N 21/854* | (2011.01) | |
| *H04L 67/02* | (2022.01) | |
| *H04L 67/01* | (2022.01) | |

(52) U.S. Cl.
CPC ..... *H04N 21/2747* (2013.01); *H04N 21/4334* (2013.01); *H04N 21/8456* (2013.01); *H04N 21/85406* (2013.01); *H04L 67/02* (2013.01); *H04L 67/42* (2013.01)

(56) References Cited

U.S. PATENT DOCUMENTS

| | | | | |
|---|---|---|---|---|
| 8,291,170 | B1* | 10/2012 | Zhang | G06F 11/1466 |
| | | | | 711/135 |
| 8,769,593 | B1* | 7/2014 | Schwartz | H04N 21/8456 |
| | | | | 725/101 |
| 9,129,348 | B2 | 9/2015 | Thakkar et al. | |
| 10,249,108 | B2 | 4/2019 | Schroeder et al. | |
| 2003/0061372 | A1 | 3/2003 | Agarwalla et al. | |
| 2004/0261091 | A1 | 12/2004 | Cherkasova et al. | |
| 2005/0132417 | A1 | 6/2005 | Bobrovskiy et al. | |
| 2006/0225072 | A1 | 10/2006 | Lari et al. | |
| 2007/0179995 | A1 | 8/2007 | Prahlad et al. | |
| 2008/0172391 | A1 | 7/2008 | Adelman et al. | |
| 2008/0215755 | A1 | 9/2008 | Farber et al. | |
| 2008/0229037 | A1 | 9/2008 | Bunte et al. | |
| 2009/0148125 | A1* | 6/2009 | Watson | H04N 5/907 |
| | | | | 386/248 |
| 2010/0223441 | A1* | 9/2010 | Lillibridge | G06F 3/0631 |
| | | | | 711/165 |
| 2010/0235528 | A1 | 9/2010 | Bocharov et al. | |
| 2011/0072450 | A1 | 3/2011 | Kokernak et al. | |
| 2011/0299586 | A1* | 12/2011 | Odlund | H04N 21/41407 |
| | | | | 375/240.01 |
| 2011/0302618 | A1* | 12/2011 | Odlund | H04L 65/608 |
| | | | | 725/109 |
| 2013/0067108 | A1* | 3/2013 | Nooney | H04L 65/60 |
| | | | | 709/231 |
| 2013/0114744 | A1* | 5/2013 | Mutton | H04L 65/601 |
| | | | | 375/240.26 |
| 2013/0268688 | A1 | 10/2013 | Galanes et al. | |
| 2014/0189761 | A1* | 7/2014 | Sood | H04N 21/8456 |
| | | | | 725/92 |
| 2014/0215214 | A1* | 7/2014 | Barnes | G06F 21/10 |
| | | | | 713/171 |
| 2014/0282787 | A1* | 9/2014 | Wirick | G11B 20/1262 |
| | | | | 725/115 |
| 2014/0358925 | A1* | 12/2014 | Jakobowski | G06F 16/13 |
| | | | | 707/737 |
| 2015/0249845 | A1 | 9/2015 | Tirosh et al. | |
| 2015/0339199 | A1 | 11/2015 | Hayasaka et al. | |
| 2016/0063223 | A1 | 3/2016 | Raley | |
| 2019/0069016 | A1 | 2/2019 | Chung et al. | |
| 2019/0268395 | A1* | 8/2019 | Davies | H04L 67/42 |
| 2019/0289356 | A1 | 9/2019 | Chung et al. | |

OTHER PUBLICATIONS

U.S. Appl. No. 16/434,110, Examiner Interview Summary Record (Ptol-413), dated Feb. 11, 2020, 1 pg.

U.S. Appl. No. 16/434,110, Non-Final Rejection, dated Sep. 30, 2019, 6 pages.

U.S. Appl. No. 16/434,110, Notice of Allowance and Fees Due (Ptol-85), dated Feb. 11, 2020, 9 pgs.

U.S. Appl. No. 15/685,971, Examiner Interview Summary dated Mar. 6, 2019, 2 pgs.

U.S. Appl. No. 15/685,971, Examiner Interview Summary dated Nov. 8, 2018, 3 pgs.

U.S. Appl. No. 15/685,971, Final Office Action dated Dec. 31, 2018, 16 pgs.

U.S. Appl. No. 15/685,971, Non Final Office Action dated Jul. 26, 2018, 15 pgs.

U.S. Appl. No. 15/685,971, Notice of Allowance dated Mar. 28, 2019, 11 pgs.

\* cited by examiner

SYSTEM AND METHOD FOR STORING MULTIMEDIA FILES USING AN ARCHIVE FILE FORMAT

CROSS REFERENCE TO RELATED APPLICATION

This application is a continuation under 35 U.S.C. § 120 and claims priority to U.S. application Ser. No. 16/434,110, entitled "SYSTEM AND METHOD FOR STORING MULTIMEDIA FILES USING AN ARCHIVE FILE FORMAT," filed Jun. 6, 2019, which is a continuation of and claims priority to U.S. application Ser. No. 15/685,971, entitled "SYSTEM AND METHOD FOR STORING MULTIMEDIA FILES USING AN ARCHIVE FILE FORMAT," filed Aug. 24, 2017, all of which are hereby incorporated by reference in their entirety.

TECHNICAL FIELD

The present disclosure relates to the networked storage and retrieval of digital files.

BACKGROUND

Digital Video Recording (DVR) technology allows users to record media content such as television programming for later playback upon request. However, conventional DVR technology suffers from several drawbacks. For example, a DVR device must typically be located and maintained in a user's home. Then, the recordings stored on the DVR device are accessible only to the devices to which the DVR device is connected, such as a single television located near the DVR device. Also, the DVR device must have or be able to access digital storage space located in the home that is adequate for storing the user's digital recordings.

Networked Digital Video Recordings (NDVR) allow centralized recordings of media content to be managed for users and delivered to various devices. In an NDVR system, the user may choose to record a live program so that she can consume it later. It could be a program that is on air at the moment, or a program that will be aired in the near future. The operator will store all the files (the multimedia files as well as the metadata) to network storage, and use them to reproduce the same multimedia experience when the user decides to watch at a later time.

NDVR technology has the potential to free users from many of the constraints associated with conventional DVR technology. For instance, recordings may be delivered to a variety of devices such as set top boxes, mobile phones, tablet computers, personal computers, laptops, and smart televisions. These devices may be positioned in a variety of locations and need not be stationary devices in a user's home. Also, with NDVR technology, the user need not own and maintain a device capable of storing the digital content within the home.

A Catch up TV system is very similar to NDVR system, but the operator decides which programs to record, and how long the recorded program should be available to the users for viewing. In either case, if the multimedia service is using the latest HTTP based adaptive streaming technologies (HLS, SS, DASH, HDS, etc.), the same multimedia files are prepared in various different bandwidths and different resolutions. Furthermore, in order to allow the clients to switch among the different representations, the multimedia tracks are composed of many small files. Since all of these files must be stored in order to reproduce the same multimedia viewing experience, it can easily create a bottleneck in the disk input/output (I/O) operations.

SUMMARY

Provided are various mechanisms and processes relating to capturing and generating multi-view interactive digital media representations for display on a user device. In one aspect, which may include at least a portion of the subject matter of any of the preceding and/or following examples and aspects, a system is provided comprising a processor, a storage device, and Random Access Memory (RAM).

The system further comprises an archive writer configured to retrieve a plurality of small multimedia segments (SMSs) in RAM and write the plurality of SMSs into an archive container file in RAM. The single archive container file may correspond to a singular multimedia file when complete. The archive writer is further configured to append new SMSs retrieved from RAM into the archive container file if the new SMSs also correspond to the singular multimedia file.

The system further comprises a recording writer configured to flush the archive container file to be stored as a digital media recording on the storage device once enough SMSs have been appended by the archive writer to the archive container file to complete the singular multimedia file.

The system may further comprise one or more recording servers. Each recording server is configured to retrieve digital media recordings stored in the storage device. Each recording server may be configured to transmit a retrieved digital media recording to a client machine upon request.

The SMSs may be generated using live streaming segmenters. Each SMS may correspond to 6 to 10 seconds of the singular multimedia file. The format of the archive container file may be the AR archive format. At least one of the digital media recordings corresponds to live broadcasts of digital media content.

Other implementations of this disclosure include corresponding devices, systems, and computer programs, as well as and associated methods for recording multimedia files. For instance, a method is provided which comprises retrieving a plurality of small multimedia segments (SMSs) in RAM. The plurality of SMSs are written into an archive container file in RAM. The single archive container file corresponds to a singular multimedia file when complete. New SMSs retrieved from RAM are appended into the archive container file if the new SMSs also correspond to the singular multimedia file. The archive container file is then flushed to be stored as a digital media recording on a storage device once enough SMSs have been appended to the archive container file to complete the singular multimedia file. The method may further comprise retrieving digital media recordings stored in the storage device and transmitting a retrieved digital media recording to a client machine upon request.

In another aspect, which may include at least a portion of the subject matter of any of the preceding and/or following examples and aspects, a non-transitory computer readable medium is provided comprising one or more programs configured for execution by a computer. In various embodiments, the one or more programs include instructions for performing the actions of described methods and systems. These other implementations may each optionally include one or more of the following features.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1A:
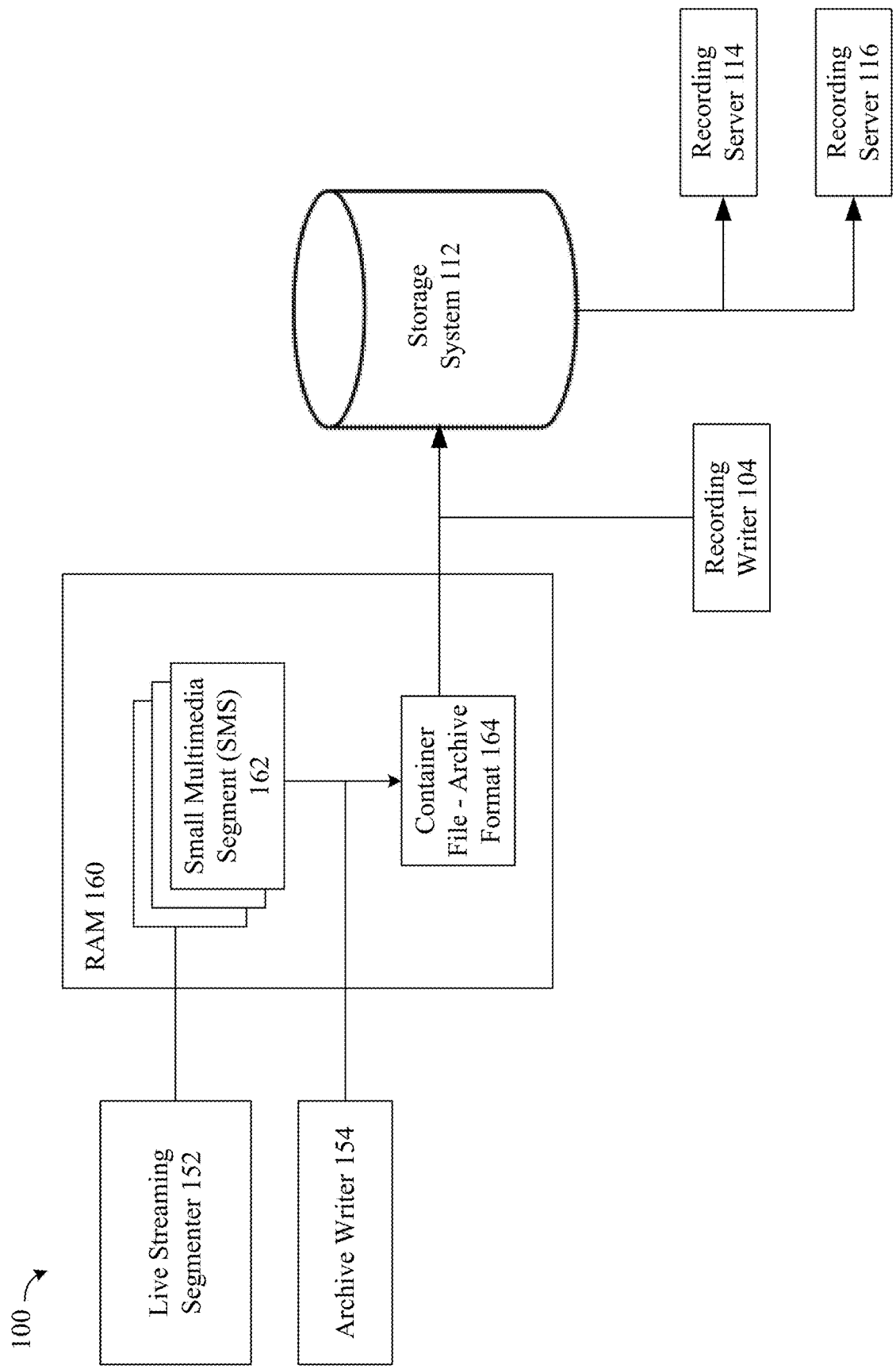
FIGS. 1A and 1B illustrate examples of a system for creating an archive file container from small media segment files, in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate high writespeed storage of files in a storage system. For instance, the files may be digital media recordings stored in a networked digital video recording (NDVR) system. Small multimedia segments (SMSs) may be generated from a live media stream and stored in Random Access Memory (RAM). Archive writers may then fetch these SMSs to create a bigger container file using an archive format like AR in the RAM. Once the container file is successfully built, it may then be flushed to a network storage component for the future streaming use.

In some embodiments, the archive writer, RAM, and storage component of the NDVR system may be located within a client device, which may also include one or more recording writers and recording servers. A recording reader may also be referred to herein as a recording server. In particular embodiments, the storage component of the NDVR system may be divided into shards, each of which includes a storage system and a number of recording readers and recording writers. When a user sends a request to store a digital content recording, a recording manager system may select one or more shards for storing the recording. Then, the NDVR system can provide the digital content recording to the user upon request.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, users may store and retrieve digital media recordings with a networked digital video recording (NDVR) service. An NDVR service may be provided by a content distributor, a content provider, or another entity. However, media content stored in a networkaccessible location may be subject to various types of rights defined by the content provider. For instance, a content distributor may provide an NVDR service and distribute content that the distributor receives from a content provider such as a cable television broadcaster. The content provider may impose a requirement that the content distributor maintain one copy of a digital media recording for each user that has access to the digital media recording via the NVDR service.

These and other requirements can in some instances create various problems for managing the NDVR service. For instance, one problem is handling the scale of writes required. Effectively, write bandwidth is determined by the number of digital media recording copies being recorded for playback. For example, a particular NVDR service may require 3.5 Mbps of recording capability per user's recordings to meet a designated quality level. The NVDR system may need to support 100,000 or more users recording content simultaneously, for instance when recording a popular film on a Saturday night or a live sporting event such as the Superbowl. In this case, the NVDR system would need to support 350 Gbps of write capacity.

Since conventional storage systems commonly have write limits in the range of 10-100 Gbps, conventional storage systems are inadequate for the purpose of providing these storage speeds. Some specialized storage systems have higher write limits. However, these specialized storage systems are often more expensive than commodity systems. Specialized storage systems also require more technical expertise to operate, are more difficult to upgrade, and are more fragile than commodity systems. Furthermore, specialized storage systems still suffer from significant write speed limitations.

In particular embodiments, techniques described herein may be used in conjunction with commodity storage systems. Accordingly, techniques described herein may be used to achieve considerable scalability and high write speeds without modification to the underlying storage system. Nevertheless, techniques described herein are not limited to use with commodity storage systems and are generally applicable to a wide variety of storage techniques.

In particular embodiments, the techniques described herein may be used to provide improved write speeds in situations where write throughput exceeds read throughput. For example, a particular digital content item may be particular popular for recording and thus generate a high write load. As another example, a particular time (e.g., Friday night, Saturday night, 6:00 pm, a holiday such as Thanksgiving Day) may be particularly popular for recording and thus generate a high write load. However, caching may allow multiple readers to access the same copy without incurring multiple reads of the storage system.

According to various embodiments, an NDVR system may be capable of storing copies of digital recordings and then providing those copies of the digital recordings upon request to client machines. The NDVR system may include communication components for communicating with client machines and content providers, a storage component for storing the digital recordings, management components for managing the NDVR system, and other subsystems.

According to various embodiments, techniques described herein may be capable of providing some or all of the following storage-related capabilities. First, the system may be capable of splitting the recording of files into multiple groups with minimal processing. Second, the system may support access or playback via a single endpoint or a limited number of endpoints. Third, the system may be capable of storing metadata for each user and each stored recording. Fourth, the system may be capable of scaling even though a single storage system has limits in the throughput achievable with the storage system. Fifth, the system may be capable storing segmented media files and generating file containers utilizing one or more various archive formats in RAM before writing to disk on network storage such that the amount of disk I/O operations is greatly reduced.

According to various embodiments, higher write capacity may be achieved by dividing the storage component of the system into shards. Each shard includes a number of recording writers and recording readers that are capable of writing to and reading from a storage system included within the shard. Additional throughput may be achieved by adding more shards. For instance, if each shard employs a storage system that can support 10 GB per second (gbps) of input video, 35 shards may be used in parallel to support a total write speed of 350 gbps.

In some conventional systems, one storage subsystem may be allocated to a first set of users while a second storage subsystem is allocated to a second set of users. However, when allocating users to the system it is difficult to determine which users will use a large amount of storage and which users will use a relatively small amount of storage space, which may result in suboptimal storage space allocation. Accordingly, in the example described above, if the first set of users includes a disproportionate number of high-usage users, the first storage subsystem may be overused while the second storage subsystem is underused. In order to allow for efficient usage and scaling of such a system, user data would need to be copied from one storage subsystem to another, which adds considerable overhead to the storage component of the NDVR system.

In particular embodiments, stored recordings may be distributed over the shards to offer improved write speed. Allowing recordings to be allocated to any available shard may eliminate or reduce the need to balance the number of users on each shard. For example, recording requests may be distributed among shards so that different shards are operating at substantially similar write speeds at a given time. As another example, recording requests may be distributed among shards so that different shards operate at substantially similar levels of storage capacity. Then, a directory system may store metadata so that a controller such as a recording manager can identify where digital media recordings are stored among the various shards.

In particular embodiments, a user's recordings may be spread across different shards. A directory may be maintained within the content delivery network to store metadata that can be leveraged to track the location of recordings among the shards. Client requests can include the shard storage location information in the request, such as in the query portion of a URL. Then, the content delivery network may easily access stored recordings. At the same time, the content delivery network may store and access cached recordings by ignoring certain identifying information, such as the shard storage location information.

According to various embodiments, techniques described herein may allow storage with scalable write throughput. In some instances, techniques may be applied to systems that employ commodity storage system components. Further, techniques may allow scalable write throughput while reducing or eliminating the need to perform user balancing across storage subsystems after recordings have been stored. Finally, such storage techniques may offer easier operational management of the storage system, for instance by reducing the necessary amount of administrator time and effort in balancing users across different storage subsystems.

According to various embodiments, techniques and mechanisms described herein may be used for any streaming format. In particular embodiments, techniques and mechanisms described herein may be used in conjunction with a streaming format that relies on the transfer of small files or file segments. However, the techniques and mechanisms are generally applicable to a wide range of video content technologies.

Although the content is often referred to herein as video content, the techniques and mechanisms described herein are generally applicable to a wide range of content and content distribution frameworks. For example, the content may be media content such as video, audio, or image content.

The storage capacity, write speed, read speed, and other characteristics described herein are included for the purpose of clarity and to provide examples. Computer hardware, software, and networking characteristics change over time. Nevertheless, the techniques described herein are widely applicable to storage systems and frameworks having various hardware, software, and networking characteristics.

According to various embodiments, the techniques described herein may be used in conjunction with an NDVR service configured for providing access to digital media recordings via a network. However, the techniques described herein are generally applicable to a variety of storage systems.

Such techniques and mechanisms for facilitating the storage of digital media recordings are further described in U.S. patent application Ser. No. 13/752,540 by Barnes, filed on Jan. 29, 2013, titled SCALABLE NETWORKED DIGITAL VIDEO RECORDINGS VIA SHARD-BASED ARCHITECTURE, which application is incorporated by reference herein in its entirety and for all purposes.

FIG. 1A illustrates one example of a system 100 for creating an archive file container from small media segment files, configured accordance with one or more embodiments. According to various embodiments, system 100 includes live streaming segmenter 152, recording writer 154, and random access memory (RAM) 160. In various embodiments, live streaming segmenter 152 may generate one or more multimedia files in the form of small multimedia segments (SMSs) 162, which may be held in RAM 160.

In various embodiments, a segmenter 152 divides a media file into fragments. In some embodiments, the fragments may be of equal length, but in other embodiments, fragments created by segmenter 152 may be of varying lengths or sizes. In some embodiments, segmenter 152 may create an index file that contains references to the fragmented files. In some embodiments, the each fragment created by segmenter 152 is stored as an SMS 162. In some embodiments, an SMS 162 may comprise a portion of the generated fragments and multiple SMSs 162 may be created from a fragment. However, in some embodiments, a single SMS 162 may be created from multiple fragments created by segmenter 152. In an example, each SMS 162 may cover a portion of a recorded program, such as six (6) to ten (10) seconds.

Archive writer 154 may then fetch one or more SMSs 162 and generate a larger container file 164 using an archive format, which is stored in RAM 160. In various embodiments, the archive format may be AR (archive) file format. In various embodiments, the container file 164 corresponds to a singular multimedia file when completely built. In some embodiments, new SMS files that correspond to the singular multimedia file may be retrieved from RAM and appended to into the container file 164. As such, the recording writer 154 may maintain groups of small multimedia segment files as a single archive file 164 in RAM 160. In some embodiments, archive writer 154 may be a module within a user device. In other embodiments, archive writer may be a module within a shard, further described below. In various embodiments, a singular multimedia file may correspond to live broadcasts of digital media content or recorded programs, such as a movie or show, or a portion thereof.

Typically, hard disk storage is magnetic, and does not depend on electricity to remember what is written on it. However, hard disk is typically much slower than RAM. A device or system can access anything stored in RAM nearly instantly, while data saved on the hard disk need to be located, read, and sent to RAM before they can be processed. Thus, fewer operations (such as write, locate, and/or read operations) are performed when appending new SMSs 162 to a container file 164 in RAM. Additionally, I/O operations occur much more slowly in hard disk storage as compared to I/O operations in RAM. Thus, access and operations to SMSs 162 and container file 164 occur very rapidly in the embodiments described herein.

According to various embodiments, system 100 is located on a network accessible to a content distributor. In some embodiments, system 100 further includes recording writer 104, a storage system 112, and recording servers 114 and 116. Once the container file 164 is successfully built in RAM 160, it may be flushed to a network storage device 112 by a recording writer 104, for the future streaming use. The container file 164 may be stored as a digital media recording on the storage device 112. In some embodiments, the digital media recordings correspond to live broadcasts of digital media content, or recorded programs. As used herein, digital media recordings may also be referred to as digital video recordings.

In some embodiments recording writer 104 may be a module within a user device. In some embodiments, recording writer 104 may be the same or related module to archive writer 154. In other embodiments, recording writer 104 may be a module within a shard, further described below. According to various embodiments, the recording writer 104 is configured to receive a digital recording via a network. The recording writer 104 may perform operations such as transmitting storage instructions to the storage system and identifying metadata for the digital recording.

The systems and methods described herein provide several advantages over existing systems. Existing systems may collect multiple multimedia files and store each individually into a single container file, such as an mp4 container file. Although, the resulting file is maintained as a valid multimedia file, existing systems include several disadvantages that decrease performance speed. For example, the container file may be written to disk with a first fragment, and new fragments are appended to the same container file over and over as they become available. While keeping the number of container files smaller, this would increase the number of disk I/O operations. For example, a container file may comprise many hundreds of fragments or more. The system may receive a new fragment then have to locate the single file container on the disk before writing the fragment to disk to append it to the container file. This may results in many hundreds (or more) locate operations and write operations for one singular multimedia file or digital media recording. Additionally, in existing systems, the writing module must constantly modify the header data in the multimedia file as new fragments are appended, which adds extra CPU load on the system.

Other existing systems may define on-demand profiles to support playing multimedia from fewer larger files, such as the indexed self-initializing media segment in DASH (Dynamic Adaptive Streaming over HTTP). In such systems, the client must know how to fetch the segments it needs by making HTTP byte range requests instead of normal file based requests. At the same time, there is no simplified method to support the adaptive streaming from a set of container files. Modifying the manifest file to use multiple periods with segments fetched by byte range requests within each period may achieve such a goal, but would also incur extra processing of the MPEG-DASH Media Presentation Description (MPD) and create additional tasks, such as constantly having to recompose the manifest file on top of constantly modifying the mp4 container file to make it a valid mp4 file.

In the above embodiments and further examples discussed herein, only one container file is created, temporarily held in RAM, and written to hard disk storage once successfully built. Thus, the disclosed systems and methods greatly reduce the number of files to generate for each recording. Furthermore, because a file container is temporarily stored in RAM while being created and only written to disk once it is successfully built, only one write operation is required for each container file corresponding to a singular multimedia file. The discussed approaches also reduce unnecessary transformations of the multimedia files by using a commonly available archive format, such as the AR archive format, which preserves the member files in the original format, and simply concatenates them with minimal additional headers.

From storage 112, a digital recording may be retrieved upon request by a recording server 114 and/or 116. According to various embodiments, the storage system may be any device or arrangement of devices capable of storing data for retrieval. In various embodiments, storage system 112 may be a hard disk on a user device and/or other network storage located on a global or local network. For instance, the storage system may include a file system implemented on a hard drive or combination of hard drives. In particular embodiments, the storage system 112 may be a commodity storage system such as a storage area network (SAN), network attached storage (NAS), or Lustre™ file system. Alternately, or additionally, the storage system 112 may be a customized or specialized system.

According to various embodiments, recording servers 114 and 116 are configured to receive a request to retrieve a recording stored as a container file 164 on the storage system 112 and provide the recording for transmission via a network. For instance, recording server 114 may receive a request for a particular recording, identify the location of the recording in the storage system 112, transmit a request to the storage system 112 to retrieve the recording, and then transmit the retrieved recording. The retrieved recording may be transmitted directly to a client machine, to a caching system, to an intermediate system configured to communicate with a client machine, or to any other subsystem.

According to various embodiments, the functions performed by a recording server may overlap considerably, or may be identical to, the functions performed by the fragmentation server described elsewhere in this application. A recording server may also be referred to herein as a reader or recording reader. Fragmentation servers and operations performed at least in part by fragmentation servers are described in greater detail with respect to FIGS. 4, 5, 9, and 10.

Figure 1B:
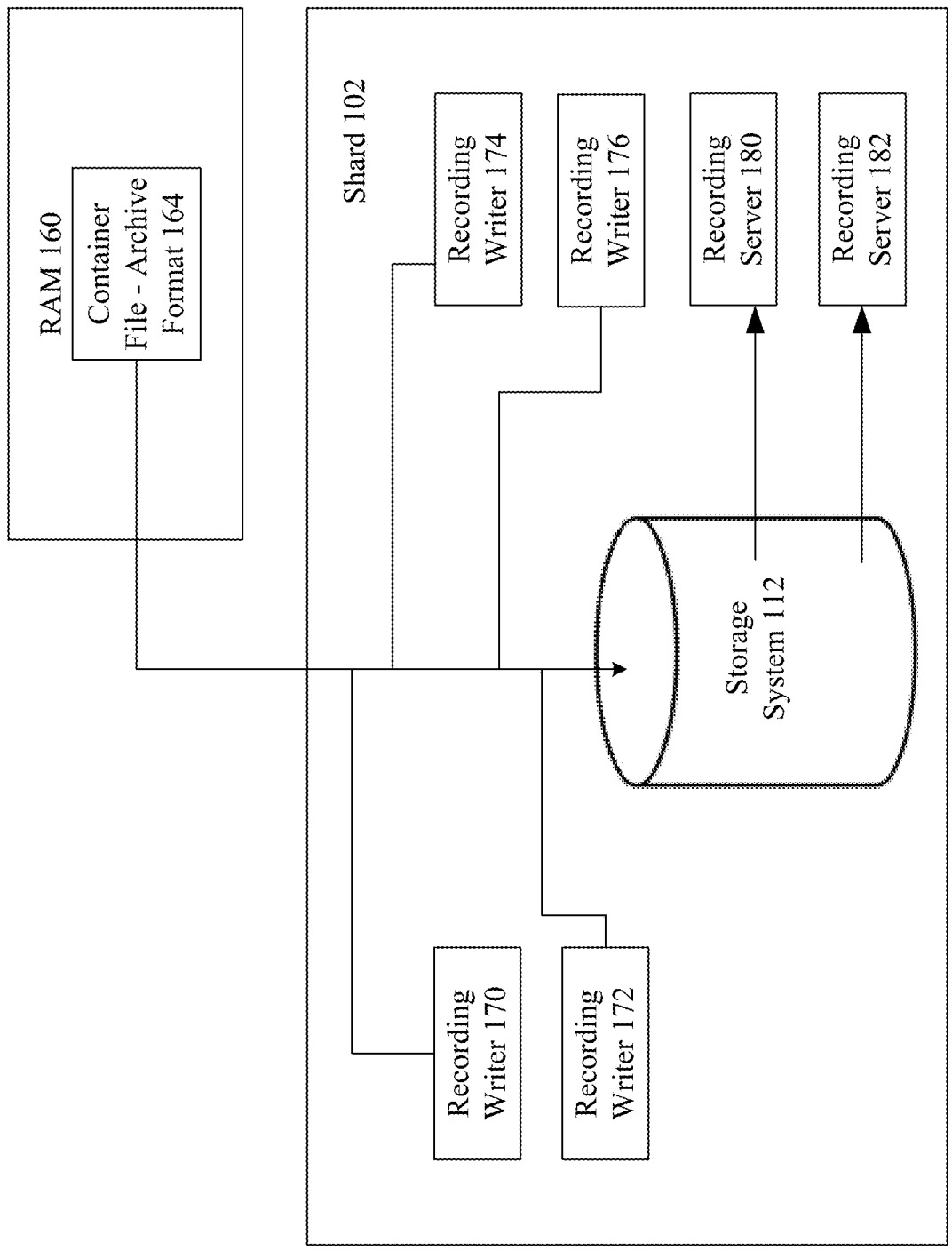

In some embodiments system 100 may represent a client device, a shard located on a network, any of various types of devices capable of data storage and processing, or a combination thereof. For example, all elements depicted in FIG. 1A may be located within a client device. FIG. 1B illustrates another example of a system 100 for creating an archive file container from small media segment files, configured accordance with one or more embodiments. In the example depicted in FIG. 1B system 100 includes a shard 102 which may be located on a network accessible to a content distributor. Shard 102 may include recording writers 170, 172, 174, and 176, storage system 112, and recording servers 180 and 182. In some embodiments, recording writers 170, 172, 174, and/or 176 may be recording writer 104 discussed in FIG. 1A. In some embodiments, recording servers 180 and/or 182 may be the same modules as recording servers 114 and/or 116. In some embodiments one or more other elements shown in FIG. 1A may be located within shard 102. In other embodiments, fewer elements may be located within shard 102 than as depicted in FIG. 1B.

According to various embodiments, shard 102 is configured to store digital content recordings received via a network. Each digital recording may be received at a recording writer and flushed to the storage system 112 for storage. Then, a digital recording may be retrieved upon request by a recording server.

In various embodiments, the recording writers 170, 172, 174, and 176 are modules configured to receive a digital recording via a network. In some embodiments, the digital content recordings received at the recording writers are SMSs 162 that have been segmented. A larger container file 164 may be created in RAM using an archive format, as previously described. One or more recording writers may then flush the completed container file 164 to storage system 112 for storage. The recording writers may perform operations such as transmitting storage instructions to the storage system and identifying metadata for the digital recording.

As depicted, RAM 160 containing container file 164 may be located separately from shard 102, such as in a user device. In some embodiments, shard 102 may also include RAM 160 or other RAM, and archive writers, such as archive writer 154. As previously described, archive writers may construct container files in such RAM before such container files are stored in storage system 212.

The system 100 includes one live streaming segmenter 152. However, according to various embodiments, a system may contain any number of live streaming segmenters. The number of live streaming segmenters may be strategically determined based on a number of factors which may include, but are not limited to, the write speed of each live streaming segmenter, the aggregate write speed of the RAM 160, and the data transfer speed of the network on which the system is located. As shown system 100 includes one archive writer, 154. However, according to various embodiments, a system may contain any number of archive writer modules. For instance, there may be one, ten, or fifty archive writers. The number of archive writers may be strategically determined based on a number of factors which may include, but are not limited to, the write speed of each archive writer, the aggregate write speed of the RAM 160, and the data transfer speed of the network on which the system is located.

The system 100 includes one recording writer as depicted in FIG. 1A and four (4) recording writers as depicted in FIG. 1B. However, according to various embodiments, the shard 102 may contain any number of recording writers. For instance, a shard may include one, ten, or fifty recording writers. The number of recording writers may be strategically determined based on a number of factors which may include, but are not limited to, the write speed of each recording writer, the aggregate write speed of the storage system 112, and the data transfer speed of the network on which the shard 102 is located. For instance, if the storage system 112 is capable of writing at 100 gbps and each recording writer is capable of writing at 10 gbps, then the shard 102 may include 10 recording writers so that the aggregate write speed of the recording writers matches the recording speed of the storage system 112.

Figure 2:
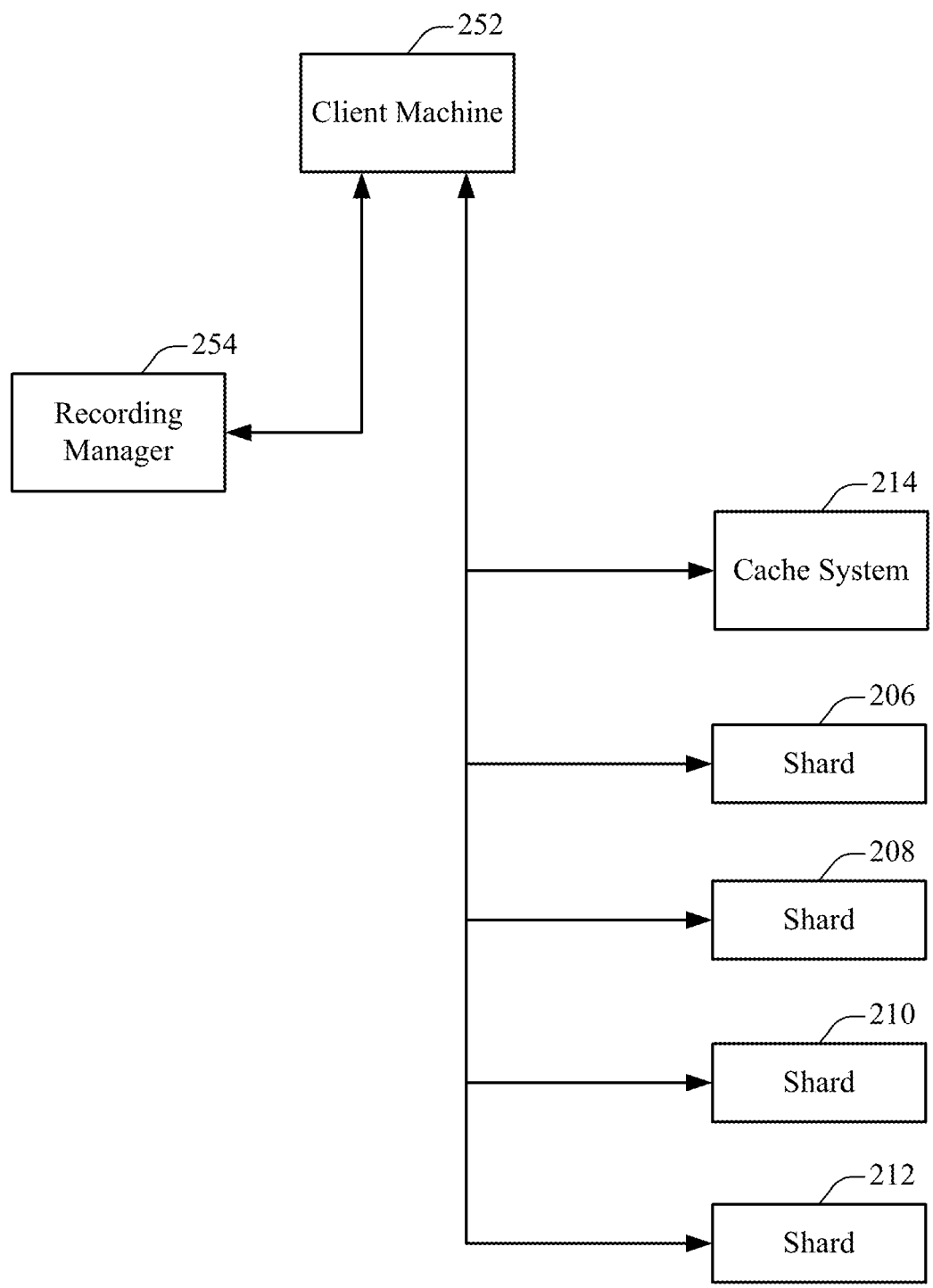
FIGS. 2-5 illustrate examples of systems that can be used with various techniques and mechanisms of the present invention.

FIG. 2 illustrates one example of a client machine in communication with various elements of a storage component of a digital video recording system, configured in accordance with one or more embodiments. According to various embodiments, the elements of the storage component shown in FIG. 2B may be used to store digital media recordings for retrieval upon request. The configuration of elements shown in FIG. 2 includes a client machine 252 in communication with a recording manager 254. In some embodiments, client machine 252 may be a client device represented by system 100. The client machine 252 may also communicate with a cache system 214 and/or the shards 206, 208, 210, and 212. In some embodiments, client machine 252 may be a client device described with reference to FIGS. 1A and 1B. In some embodiments, shards 206, 208, 210, and 212 may be an example of shard 102 depicted in FIG. 1B.

In some embodiments, cache system 214 may include RAM, such as RAM 160. In other embodiments, RAM may be additionally, and/or alternatively, located in one or more separate locations from cache system 214, such as in shard 206, 208, 210, or 212, client machine 252, and/or recording manager 254. In some embodiments, cache system may include other network storage that stores constructed container files, similar to storage system 112 and/or 212.

In some embodiments, a digital video recording may be stored on the hard disk storage, such as storage system 112, of client machine 252. Such digital video recording may be accessed directly to be viewed on the client machine 252. However, digital video recordings may alternatively and/or additionally be stored within cache system 214 or among one or more various shards in a network. According to various embodiments, the client machine 252 may transmit a request to the recording manager 254 for information indicating how to retrieve a digital video recording. The request may identify a user or content management account associated with the client machine 252. This identifying information may be used to determine if the account is associated with a copy of a recording of the requested digital video recording and, if so, where the copy is located among the shards.

According to various embodiments, the recording manager 254 is configured to access a data directory or database that indicates where among the shards the requested copy of the digital video recording is located. The recording manager 254 determines that the user requesting the digital video recording has permission to access it.

According to various embodiments, the recording manager 254 may determine whether the requested digital video recording is stored in the cache system 214. Alternately, the recording manager 254 may provide address information to the client machine 252 that can be used to query the cache system 214 to determine whether a cached copy is present. Communication between the client machine 252 and the recording manager 254 is discussed in additional detail with respect to FIG. 7.

According to various embodiments, the client machine 252 uses the information received from the recording manager 254 to request the digital media recording. The information can be used to first send a request to the cache system 214. The cache system 214 may ignore any personalized information included in the request, such as user identification information and shard identification information. The cache system 214 may analyze the cache to determine whether the requested digital video recording has been cached.

According to various embodiments, a cached digital video recording copy may be provided to the client machine with less overhead, such as storage system access, than a copy that is not cached. The cache system may maintain copies of recently and/or frequently accessed digital video recordings. For instance, if many users are requesting copies of a popular recording such as the recent Superbowl, a copy of the recording may be stored in the cache to facilitate efficient transfer to client machines and to minimizing computing resource expenditure.

According to various embodiments, if the requested digital video recording is not cached, then a request may be transmitted to the appropriate shard to retrieve a copy of the digital video recording. The digital video recording may be stored in the hard disk storage of one or more shards, as discussed with reference to FIGS. 1A and 1B. The location of the digital video recording may be identified in the information transmitted by the recording manager 254. The location information may identify which of the shards 206, 208, 210, and 212 is storing the requested digital video recording copy. The retrieval of a digital video recording copy is discussed in further detail with respect to FIG. 8.

According to various embodiments, an NDVR system may include any number of shards. For instance, FIG. 2 depicts four shards, but other NDVR systems may include one shard, two shards, ten shards, fifty shards, or any other number of shards. The number of shards may be increased to scale the write capacity of the NDVR storage component. For example, in one example each shard may support a write capacity of 100 gbps. To achieve a total write capacity of 500 gbps, five shards may be used.

In particular embodiments, not all shards need exhibit the same write capacity, just as not all recording writers need exhibit the same write capacity. Write capacity, read capacity, and other capabilities may depend on hardware and software characteristics of the underlying system. For instance, one storage system, recording writer, fragmentation server, hard drive, network interface, or other subsystem may be replaced with a different subsystem that has different capabilities and characteristics.

According to various embodiments, a storage component of an NDVR system may include communication links not shown in FIG. 2. For instance, the recording manager 254 is capable of communicating the location of a requested digital video recording to the client machine 252. Accordingly, the recording manager 254 may coordinate with the shards when the digital video recording is originally stored on the shards. The recording manager 254 may then maintain or access a database of storage locations indicating where each copy of each digital video recording is stored among the shards.

According to various embodiments, a storage component of an NDVR system may include components and subsystems not shown in FIG. 2. For instance, the client machine 252 may communicate with the cache system 214 and the shards via a server that coordinates the communication. The client machine 252 may transmit a request to the server, which may then determine whether the requested digital video recording is cached in the cache system 214. The server may then direct the transmission of the requested recording from the appropriate network location to the client machine 252.

Figure 3:
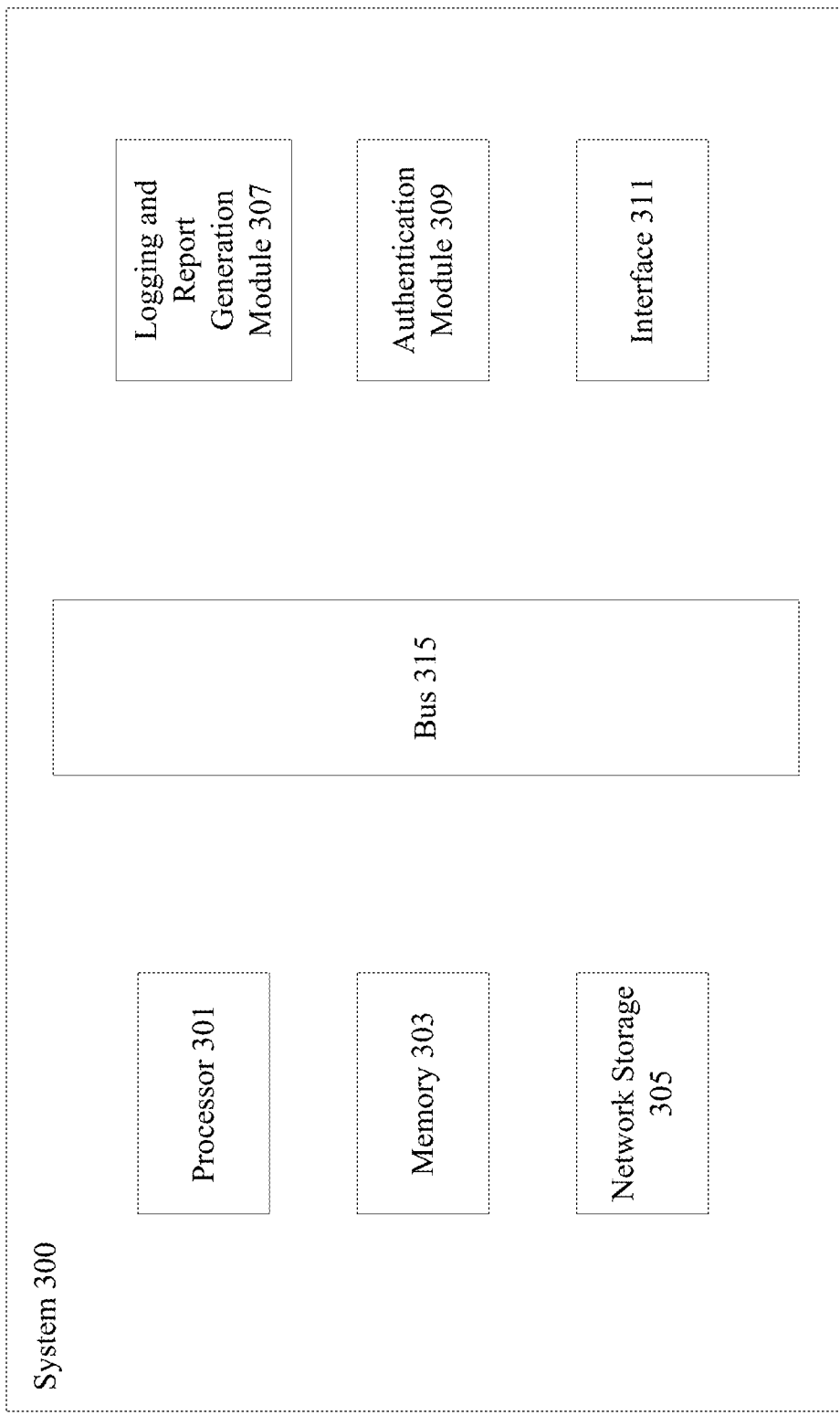

FIG. 3 illustrates one example of a server system that can be used with various embodiments of the present disclosure. According to particular embodiments, a system 300 suitable for implementing particular embodiments of the present invention. For example, system 300 may be cache system 214, recording manager 254, client machine 252, and/or any one of the shards previously described. In various embodiments, system 300 includes a processor 301, a memory 303, network storage 305, an interface 311, and a bus 315 (e.g., a PCI bus or other interconnection fabric) and operates as a streaming server. When acting under the control of appropriate software or firmware, the processor 301 is responsible for modifying and transmitting live media data to a client. Various specially configured devices can also be used in place of a processor 301 or in addition to processor 301. The interface 311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to particular example embodiments, memory 303 may comprise RAM, such as RAM 160. In some embodiments, network storage 305 may be a hard disk on a user device and/or other network storage located on a global or local network. For instance, the network storage 305 may include a file system implemented on a hard drive or combination of hard drives. As previously described, the storage system of network 305 may be a commodity storage system such as a storage area network (SAN), network attached storage (NAS), Lustre™ file system, or a customized or specialized system. In some embodiments, the system 300 uses memory 303 and/or network storage 305 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

According to various embodiments, the system 300 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module 309 verifies the identity of devices including mobile devices. A logging and report generation module 307 tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

Figure 4:
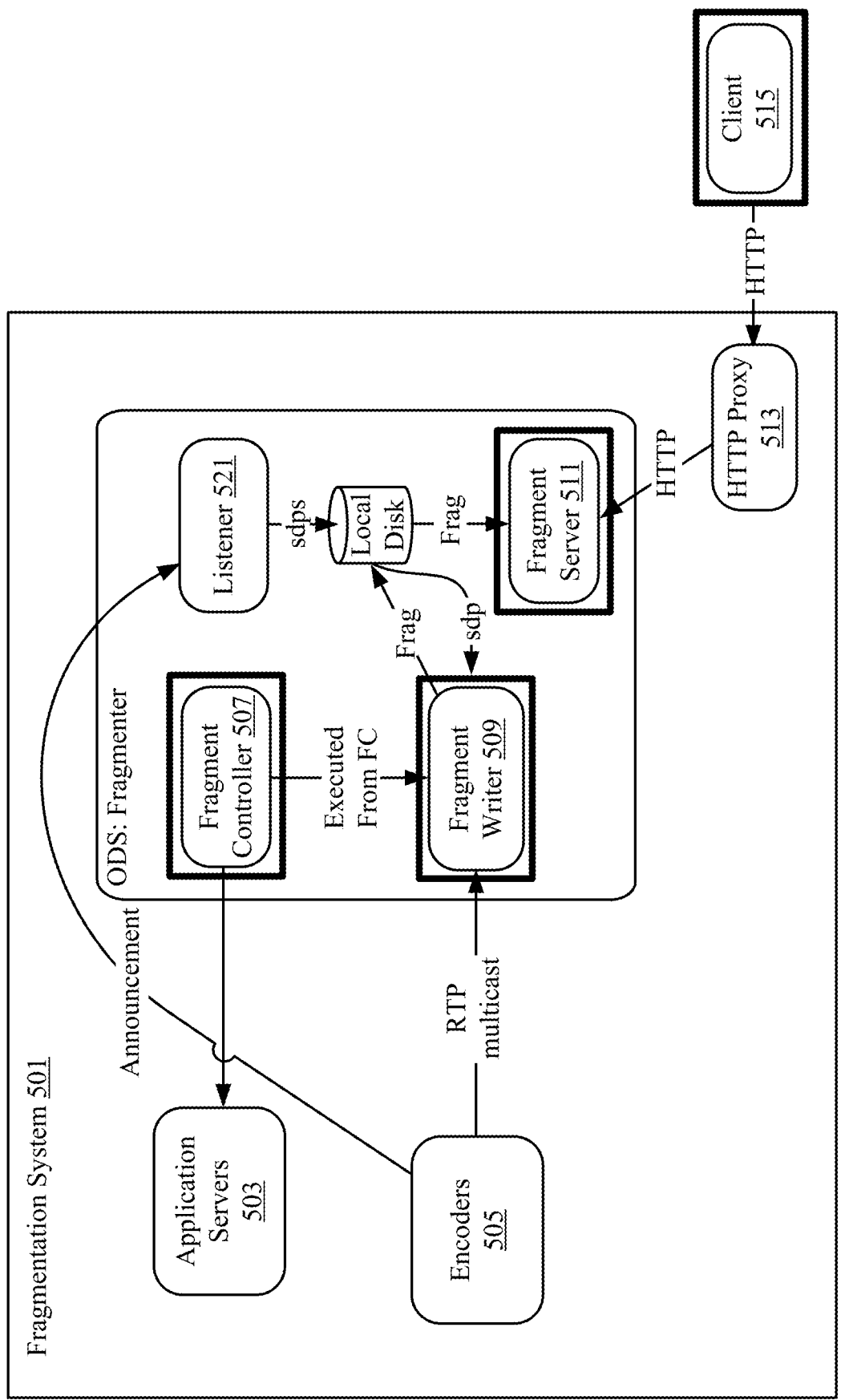

FIG. 4 is a diagrammatic representation illustrating one example of a fragment or segment system 401 associated with a content server that may be used in a broadcast and unicast distribution network. Encoders 405 receive media data from satellite, content libraries, and other content sources and sends RTP multicast data to fragment writer 409. The encoders 405 also send session announcement protocol (SAP) announcements to SAP listener 421. According to various embodiments, the fragment writer 409 creates fragments for live streaming, and writes files to disk for recording. The fragment writer 409 receives RTP multicast streams from the encoders 405 and parses the streams to repackage the audio/video data as part of fragmented MPEG-4 files. When a new program starts, the fragment writer 409 creates a new MPEG-4 file on fragment storage and appends fragments. In particular embodiments, the fragment writer 409 supports live and/or DVR configurations.

The fragment server 411 provides the caching layer with fragments for clients. The design philosophy behind the client/server application programming interface (API) minimizes round trips and reduces complexity as much as possible when it comes to delivery of the media data to the client 415. The fragment server 411 provides live streams and/or DVR configurations.

The fragment controller 407 is connected to application servers 403 and controls the fragmentation of live channel streams. The fragmentation controller 407 optionally integrates guide data to drive the recordings for a global/network DVR. In particular embodiments, the fragment controller 407 embeds logic around the recording to simplify the fragment writer 409 component. According to various embodiments, the fragment controller 407 will run on the same host as the fragment writer 409. In particular embodiments, the fragment controller 407 instantiates instances of the fragment writer 409 and manages high availability.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
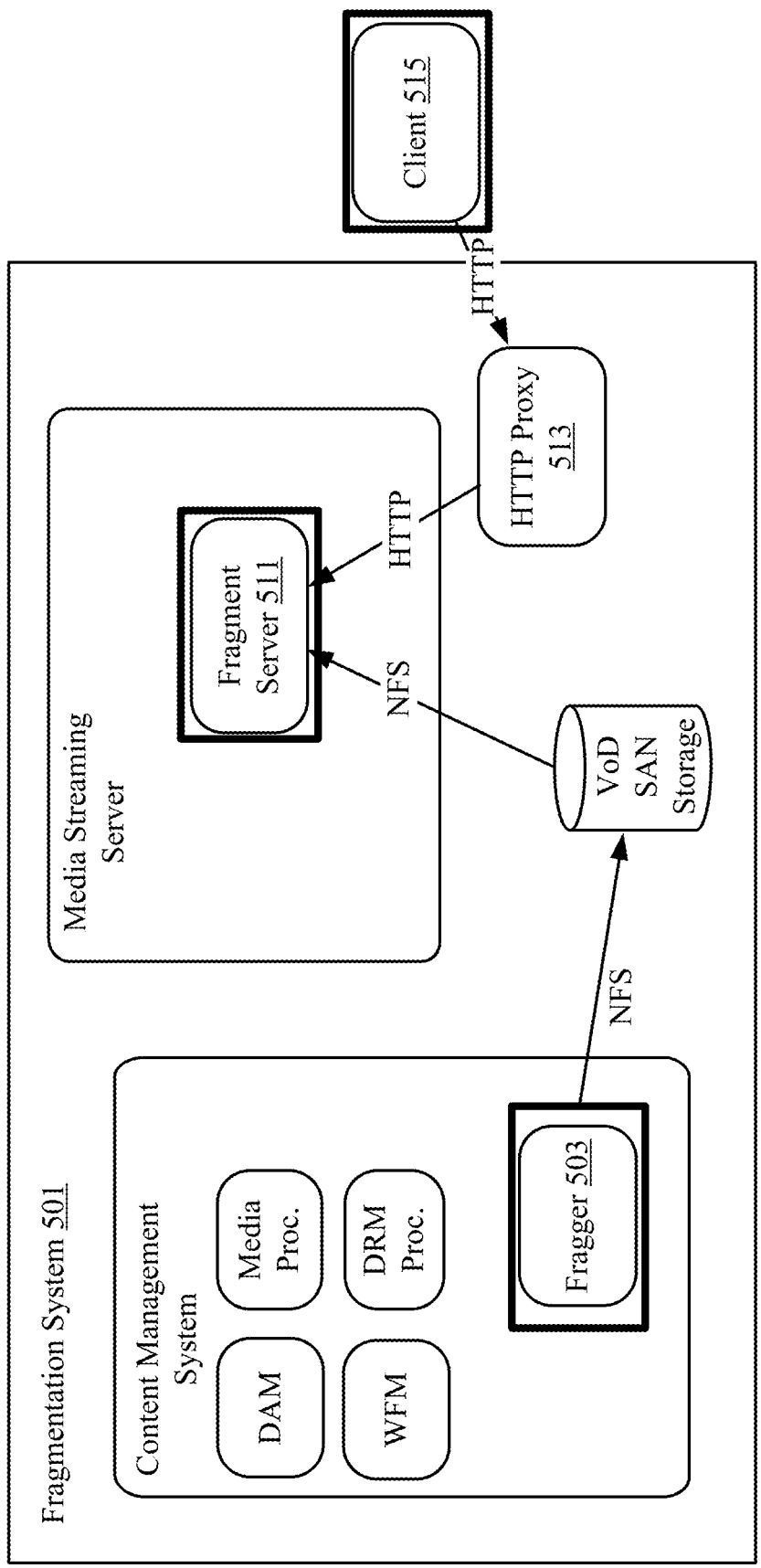

FIG. 5 illustrates one example of a fragmentation system 501 that can be used for video-on-demand (VoD) content. Fragger 506 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 511 provides the caching layer with fragments for clients. The design philosophy behind the client/server API minimizes round trips and reduces complexity as much as possible when it comes to delivery of the media data to the client 515. The fragment server 511 provides VoD content.

According to various embodiments, the client 515 uses a media component that requests fragmented MPEG-4 files, allows trick-play, and manages bandwidth adaptation. The client communicates with the application services associated with HTTP proxy 513 to get guides and present the user with the recorded content available.

Figure 6:
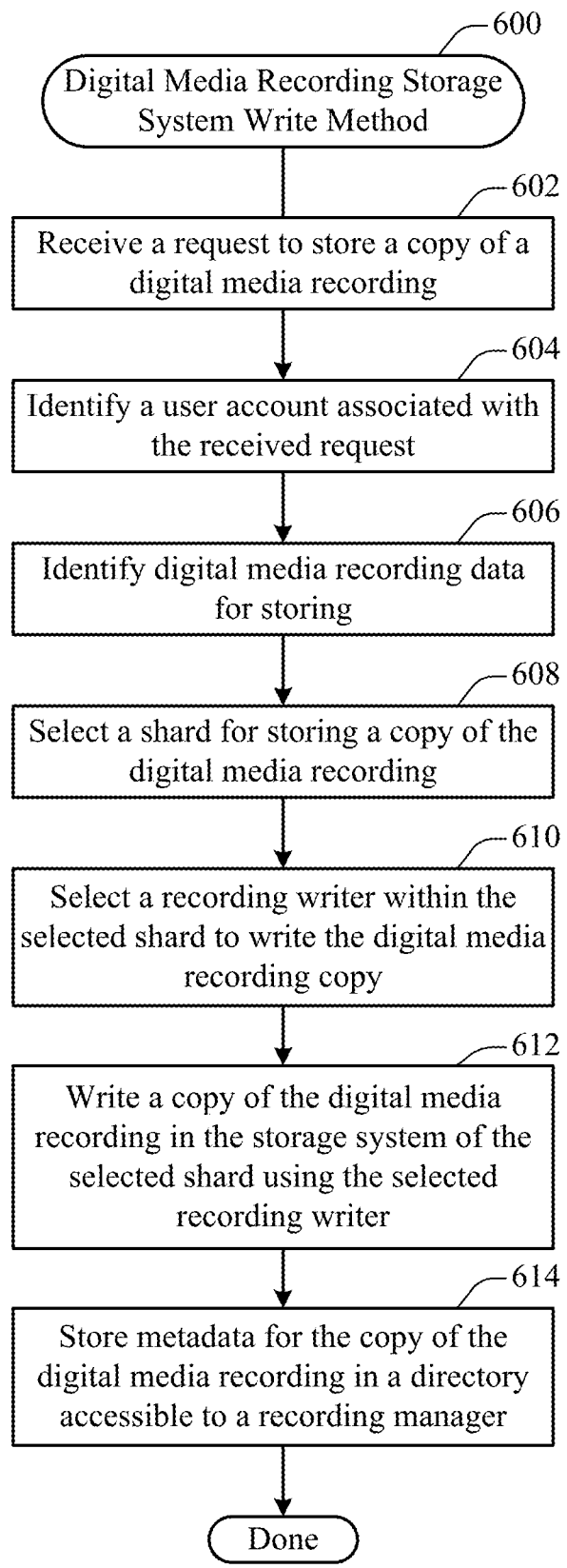
FIG. 6 illustrates an example of a digital media recording storage system write method.

FIG. 6 illustrates an example of a digital media recording storage system write method 600. According to various embodiments, the method 600 may be used to identify digital media such as digital video for recording and then store the digital media on a network storage system, such as storage system 112, for subsequent retrieval.

At 602, a request to store a copy of a digital media recording is received. According to various embodiments, the request may be received at a recording manager such as the recording manager 254 discussed with respect to FIG. 2. The request may be received from a user of a content management system. The request may be generated by the user or may be generated automatically. For instance, the user may transmit a request to store a copy of a digital recording of a broadcast or cable television program when the program is broadcast in the future.

At 604, a user account associated with the received request is identified. According to various embodiments, a user account or content management account may be associated with the NDVR system. The content management account may be associated with access information that indicates access rights associated with the content management account. The access rights may allow users associated with the content management account to receive digital media content from one or more digital media content providers.

According to various embodiments, the content management account may be identified based on information transmitted with the request received at operation 602. For instance, the user may have previously logged in to a content management account. Then, a web browser cookie or other identifying information may be transmitted along with the request to store a copy of the digital media recording received at operation 602.

At 606, digital media recording data is identified for storing. According to various embodiments, the digital media recording data may be digital media content that is being broadcast over a network such as broadcast television, satellite television, cable television, the Internet, or some other network. The digital media content may be broadcast in a live streaming format such that the user identified at operation 604 has the right to access the digital media content. However, the digital media content may be unavailable after it is broadcast unless it is stored in some way.

In some embodiments, the digital media recording data may exist as a file container in an archive format, such as container file 164. In some embodiments, the digital media content may be segmented into small multimedia segments, such as SMSs 162, and then written into a larger container file 164. Such container file 164 may be stored in RAM, such as RAM 160.

According to various embodiments, the digital media recording data may be received by the NDVR system for storing copies of recordings. For instance, the Superbowl may be broadcast by a particular television network. The NDVR system may then receive a copy of the broadcast stream. Some number of users (e.g., 100,000) may each request to store a copy of the broadcast in the NDVR system for later replay. Accordingly, the NDVR system may transmit one copy of the broadcast stream per each of the 100,000 users for storage in a shard.

At 608, a shard is selected for storing a copy of the digital media recording. As discussed with respect to FIG. 2, the storage component of an NDVR system may include various numbers of shards. According to various embodiments, the shard may be selected based on various factors, which may include, but are not limited to, shard storage capacity and shard write capacity. For example, one shard may be at 75% storage capacity while another shard may be at 50% storage capacity. In this case, the second shard may be selected. As another example, one shard may be at 60% write capacity while another shard may be at 80% write capacity. In this example, the first shard may be selected. In this way, the storage volume and/or write capacity utilization may be distributed among the shards.

In some embodiments, one or more shards described may be included within a user device, such a client device or client machine 252. In some embodiments, a user device, instead of a shard, is selected at 608, for storing a copy of the digital media recording in a storage system therein, such as in storage system 112.

At 610, a recording writer within the selected shard, and/or user device, is selected to write the digital media recording copy. According to various embodiments, a shard may be selected based on write throughput capacity. For example, the shard may include ten recording writers and may be using only six of them to write data at a particular point in time. Then, one of the unused recording writers may be selected. As another example, the shard may include some number of recording writers that are each writing at full speed. Then, the digital media recording copy may be added to a write queue associated with one of the shards, such as the shard with the shortest write queue.

At 612, a copy of the digital media recording is written in the storage system of the selected shard using the selected recording writer. As discussed with respect to FIG. 2, the recording writer may interact with the storage system located in the shard to store the digital media recording copy.

At 614, the metadata for the copy of the digital media recording is stored in a directory accessible to the recording manager. According to various embodiments, the directory may be used to determine where among the shards the digital media recording copy is stored. The metadata may identify information such as the identity of the user account associated with the recording copy, the identity of the media that is represented by the recording copy, and other such information.

Figure 7:
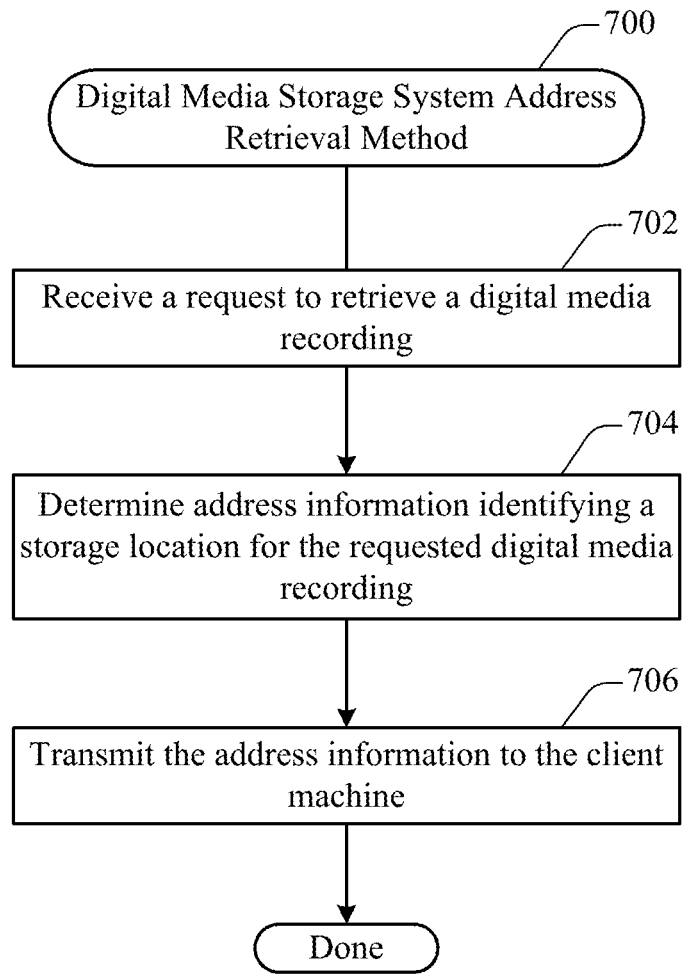
FIG. 7 illustrates an example of a digital media recording storage system address retrieval method.

FIG. 7 illustrates an example of a digital media recording storage system address retrieval method 700. According to various embodiments, the method 700 may be used by a recording manager in communication with a client machine, such as the recording manager and client machine shown in FIG. 2. The method 700 may be used to receive a request for location information identifying access information for a digital media recording from the client machine, identify the requested information, and transmit the information to the client machine. The client machine may then use the information to access the requested digital media recording.

In particular embodiments, the method 700 may be triggered when a user at a client machine requests a copy of the digital media recording. For instance, the user may request a copy the recording from a client device such as a smart television, mobile phone, or computer. The user may request the copy in order to present digital media content that was originally presented in a live broadcast format and then recorded in the NDVR system at the user's request.

At 702, a request to retrieve a digital media recording is received. According to various embodiments, the request may be received at a recording manager, such as the recording manager shown in FIG. 2. As discussed with respect to FIG. 2, the recording manager may be configured to track and provide information identifying the location of recording copies among the various shards.

At 704, address information identifying a storage location for the requested digital media recording is determined. According to various embodiments, the digital recording manager may identify the address information by looking it up in a database or data directory that identifies recording copies stored among the shards.

According to various embodiments, the address information may include various types of information used for accessing the requested media recording copy. For instance, the address information may include the identity of the host at which the recording copy is located, the identity of the recording copy, the file name of the recording copy, an identity of the user account associated with the recording copy, a bit rate at which the recording copy is encoding, a recording identifier, a channel, and/or any other information. The address information may be transmitted piecemeal, in the form of a URL, or in some other form factor.

At 706, the address information is transmitted to the client machine. According to various embodiments, the address information may be transmitted via a network such as the Internet. The address information may then be used by the client machine to retrieve the copy of the digital media recording from the location at which the copy is stored. Techniques for retrieving a digital media recording are discussed in further detail with respect to FIG. 8.

Figure 8:
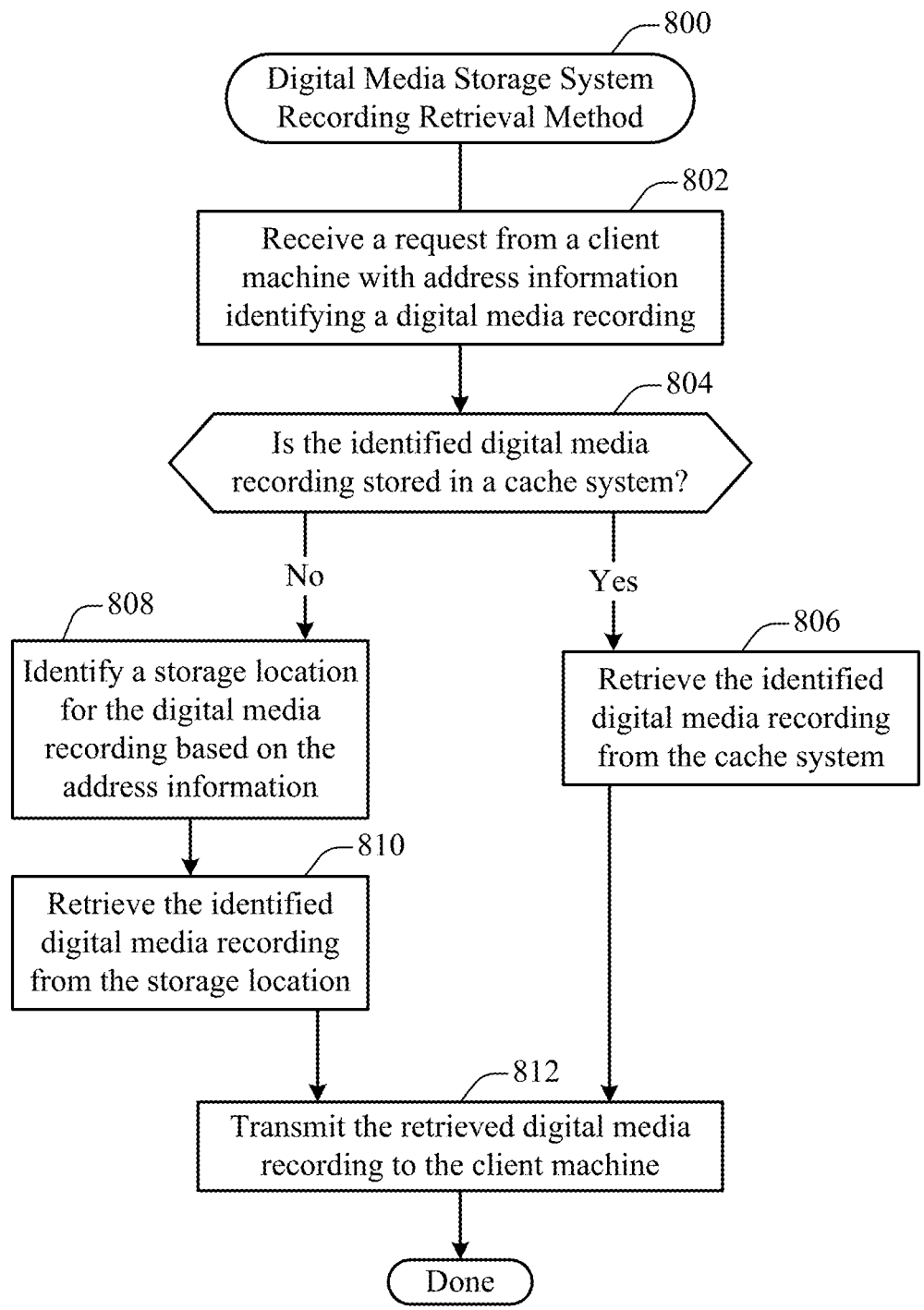
FIG. 8 illustrates an example of a digital media recording storage system recording retrieval method.

FIG. 8 illustrates an example of a digital media recording storage system recording retrieval method 800. According to various embodiments, the method 800 may be performed at a digital media system such as those described with respect to FIGS. 1A, 1B, 2-5 and 9-10. The method 800 may be used to receive a request for a copy of a digital media content recording from a client machine, to locate the digital media content recording copy, and to transmit the digital media content recording copy to the client machine.

At 802, a request is received from a client machine with address information identifying a digital media recording. According to various embodiments, the request may be received at a caching system, at a shard (e.g., at a recording reader located within a shard), or at a server configured to coordinate communication among the shards, the client machine, and/or the caching system.

According to various embodiments, the request may include some or all of the information received from the recording manager as discussed with respect to FIG. 7. For instance, the request may identify the identity of the host at which the recording copy is located, the identity of the recording copy, the file name of the recording copy, an identity of the user account associated with the recording copy, a bit rate at which the recording copy is encoding, and/or any other information.

At 804, a determination is made as to whether the identified digital media recording is stored in a cache system. According to various embodiments, the determination may be made at a server such as a fragmentation server, at the cache system, or at some other element of the content management system. The determination may be made at least in part by searching a database such as a cache system directory with information identifying the recording but omitting user-specific information such as a user identifier, a shard identifier, and other such information.

According to various embodiments, a cached copy of a digital media recording may be stored for popular digital media recordings, for recently accessed digital media recordings, for recently stored digital media recordings, or for any other digital media recordings stored within the system.

At 806, the identified digital media recording is retrieved from the cache system. According to various embodiments, retrieving the digital media recording may involve identifying a location of the digital media recording within the cache system for transmission to the client machine. In some systems, the location information may be transmitted to a different subsystem, such as a server configured to transmit the digital media recording to the client machine.

At 808, a storage location for the digital media recording is identified based on the address information. According to various embodiments, the storage location may be identified based on the information received with the request. For example, the client machine may transmit a request directly to the shard and/or fragmentation server capable of accessing the digital media recording copy. As another example, the client machine may transmit a request to a server, which may then contact the shard on which digital content recording may be accessed.

At 810, the identified digital media recording is retrieved from the storage location. According to various embodiments, as discussed with respect to FIG. 2, the digital media recording may be retrieved by a fragmentation server or recording reader. The fragmentation server may perform operations such as separating the digital media recording into fragments for transmission to the client machine. Fragmentation servers are discussed in further detail with respect to FIGS. 4, 5, 9, and 10. At 812, the retrieved digital media recording is transmitted to the client machine. As discussed herein, in some embodiments the digital media recording may be transmitted in segments or fragments. Alternately, the digital media recording may be transmitted as a single file or in some other format.

Figure 9:
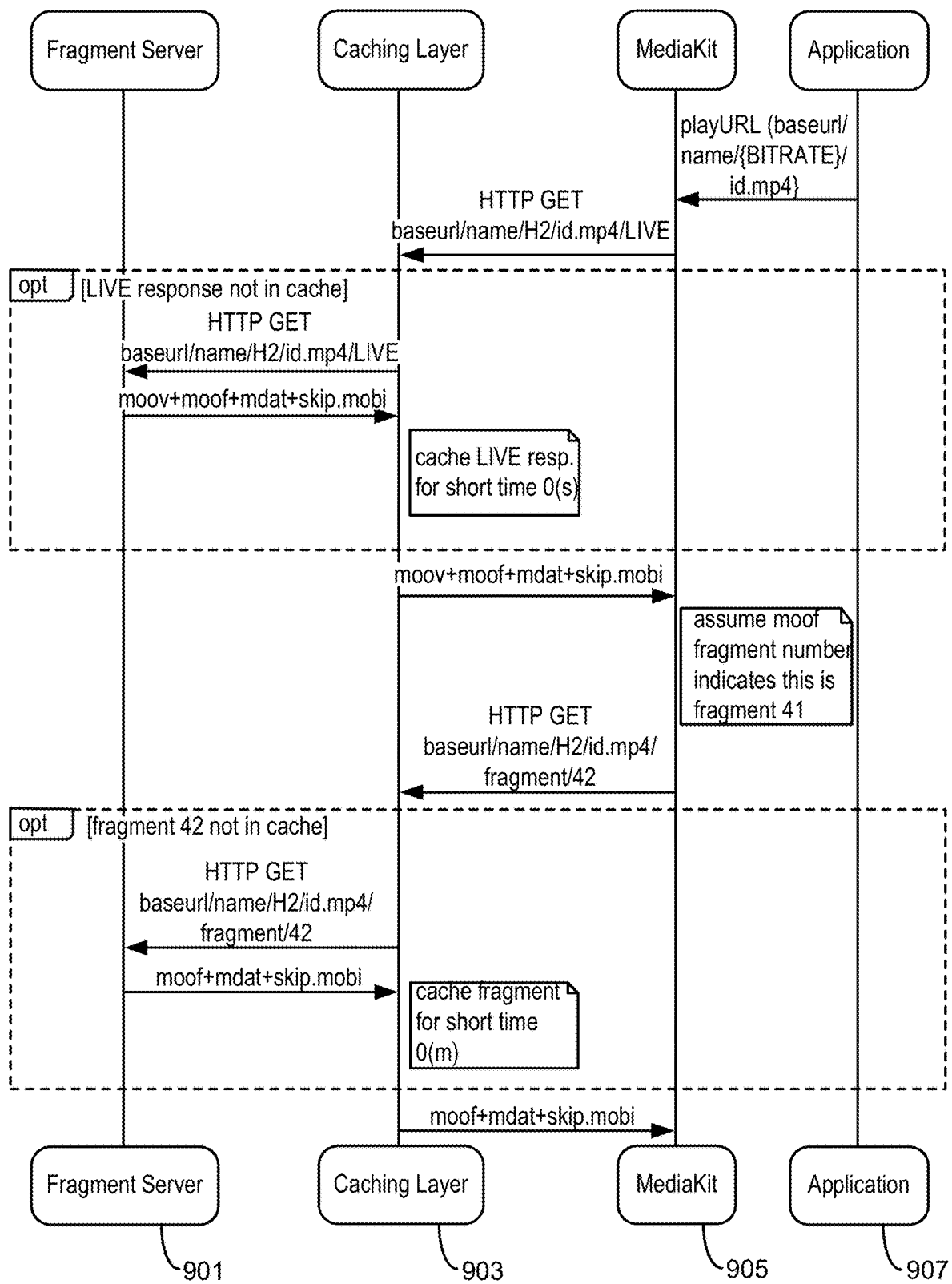
FIG. 9 illustrates one example of an exchange used with a media delivery system.

FIG. 9 illustrates an interaction for a client receiving a media stream such as a live stream. The client starts playback when fragment 41 plays out from the server. The client uses the fragment number so that it can request the appropriate subsequent file fragment. An application such as a player application 907 sends a request to mediakit 905. The request may include a base address and bit rate. The mediakit 905 sends an HTTP get request to caching layer 903. According to various embodiments, the live response is not in cache, and the caching layer 903 forwards the HTTP get request to a fragment server 901. The fragment server 901 performs processing and sends the appropriate fragment to the caching layer 903 which forwards to the data to mediakit 905.

The fragment may be cached for a short period of time at caching layer 903. The mediakit 905 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 905 may request a next fragment having a different data rate. In some instances, the mediakit 905 may request a next fragment having a higher data rate. According to various embodiments, the fragment server 901 maintains fragments for different quality of service streams with timing synchronization information to allow for timing accurate playback.

The mediakit 905 requests a next fragment using information from the received fragment. According to various embodiments, the next fragment for the media stream may be maintained on a different server, may have a different bit rate, or may require different authorization. Caching layer 903 determines that the next fragment is not in cache and forwards the request to fragment server 901. The fragment server 901 sends the fragment to caching layer 903 and the fragment is cached for a short period of time. The fragment is then sent to mediakit 905.

Figure 10:
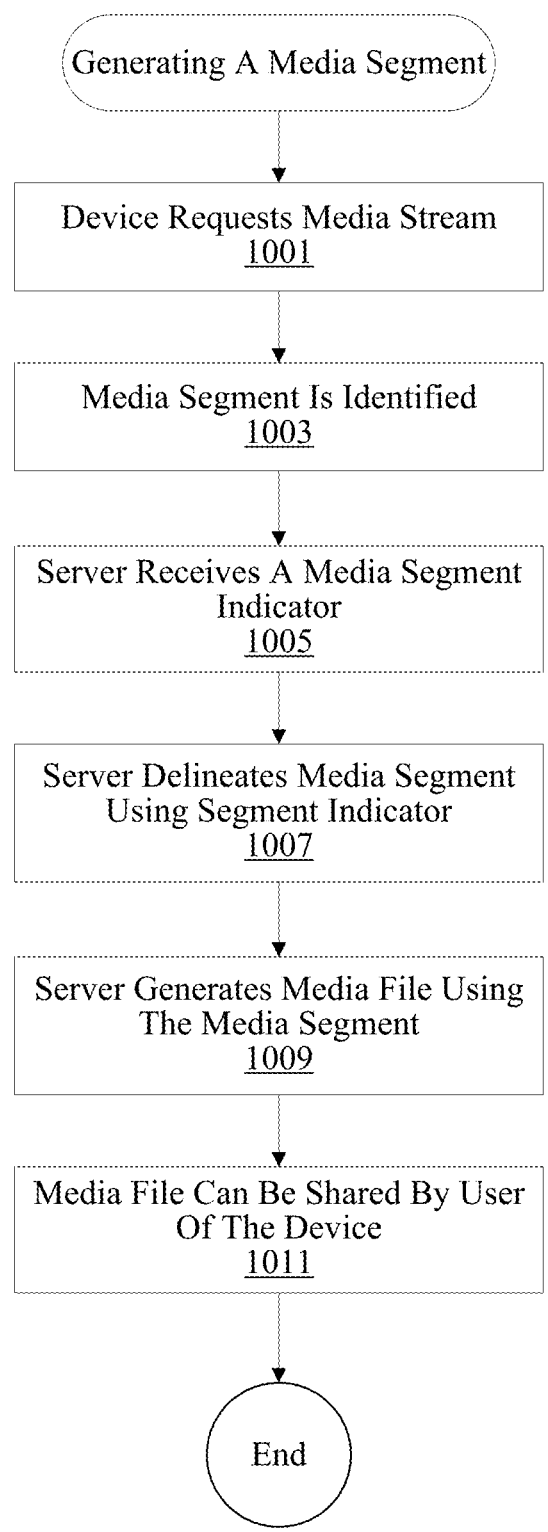
FIG. 10 illustrates one technique for generating a media segment.

FIG. 10 illustrates a particular example of a technique for generating a media segment. According to various embodiments, a media stream is requested by a device at 1001. The media stream may be a live stream, media clip, media file, etc. The request for the media stream may be an HTTP GET request with a base url, bit rate, and file name. At 1003, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 1005, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 1007. The media stream may only be available in a channel buffer. At 1009, the server generates a media file using the media segment maintained in cache. The media file can then be shared by a user of the device at 1011. In some examples, the media file itself is shared while in other examples, a link to the media file is shared.

Figure 11A:
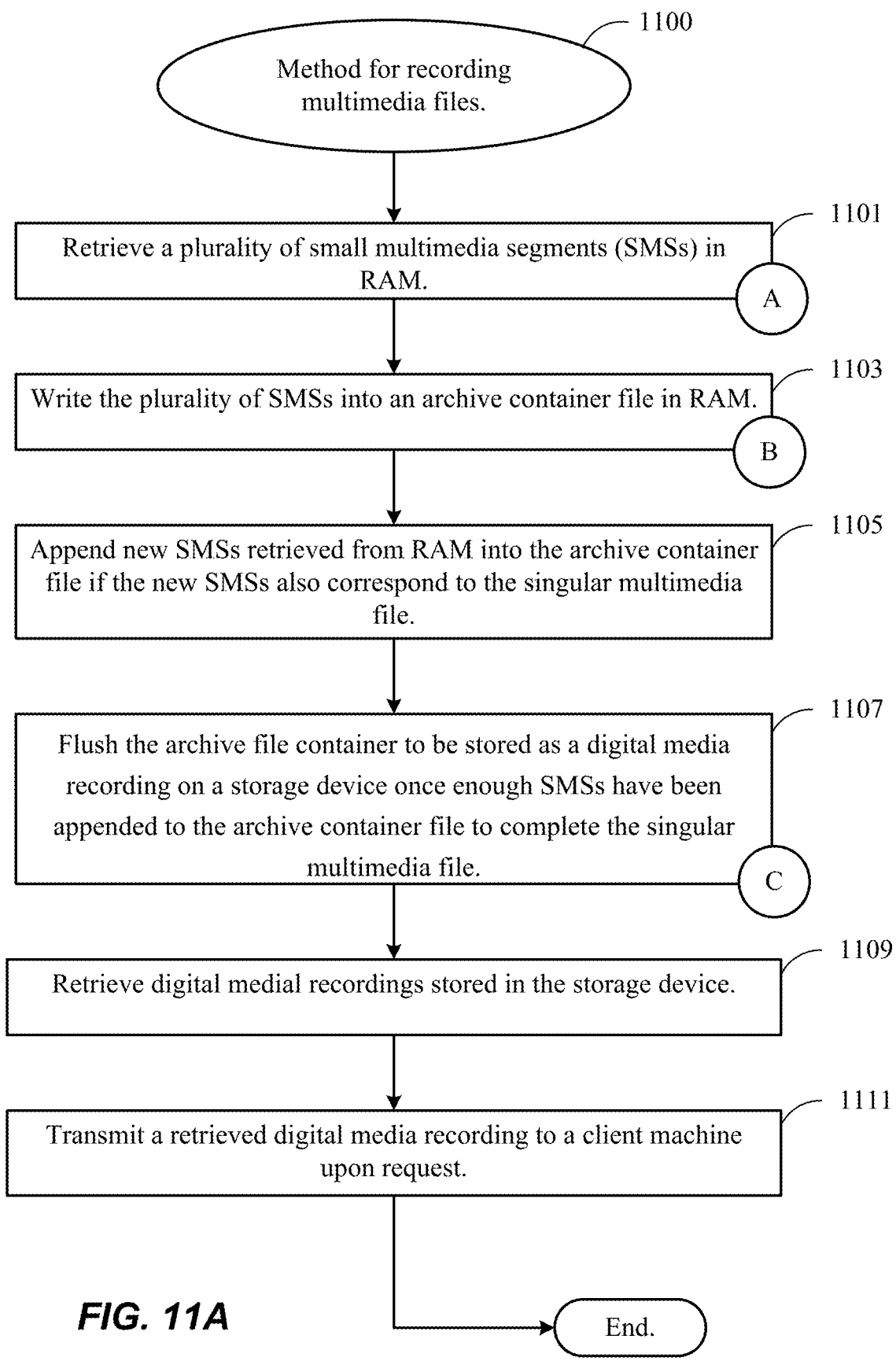
FIGS. 11A and 11B illustrate an example method for recording multimedia files, in accordance with one or more embodiments.
Figure 11B:
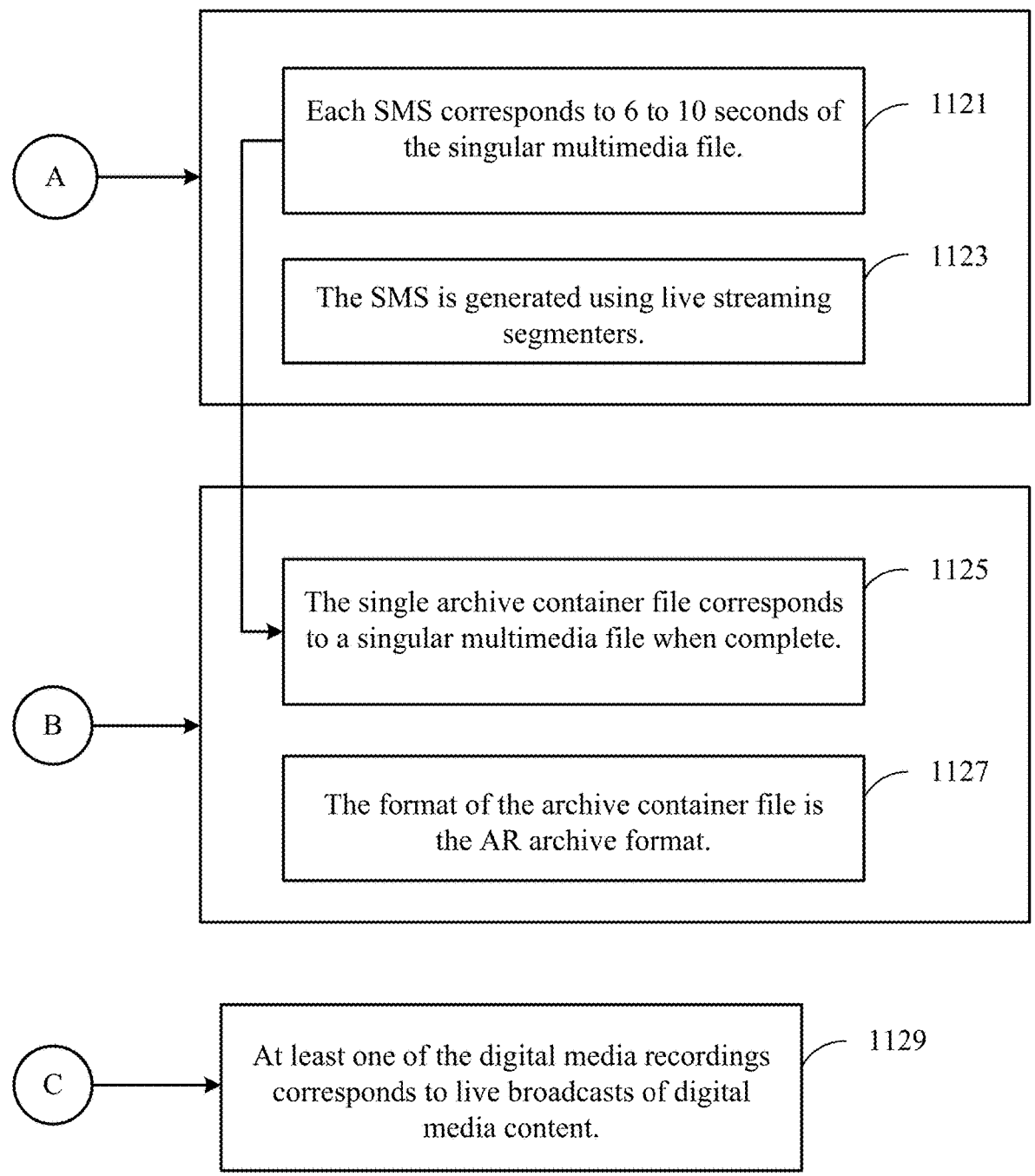

FIGS. 11A and 11B illustrate an example method 1100 for recording multimedia files, in accordance with one or more embodiments. According to various embodiments, the method 1100 may be performed at a digital media system such as those described with respect to FIGS. 1A, 1B, 2, and 3.

At operation 1101, a plurality of small multimedia segments (SMSs) 1121 in Random Access Memory (RAM) are retrieved. In some embodiments, SMSs 1121 may be SMSs 162, which are stored in RAM 160. At operation 1103, the plurality of SMSs are written into an archive container file 1125 in RAM. For example, the plurality of SMSs may be written by an archive writer, such as archive writer 154. The single archive container file 1125 may correspond to a singular multimedia file when complete. In some embodiments, each SMS 1121 corresponds to 6 to 10 seconds of the singular multimedia file. Such SMSs may be generated using live streaming segmenters 1123. In some embodiments, live streaming segmenters 1123 may be live streaming segmenters 164.

At operation 1105, new SMSs retrieved from RAM are appended into the archive container file if the new SMSs also correspond to the singular multimedia file. At operation 1107, the archive file container is flushed to be stored as a digital media recording 1129 on a storage device once enough SMSs have been appended to the archive container file to complete the singular multimedia file. In various embodiments, a singular multimedia file may correspond to any number of SMSs depending on size of fragments created and/or SMSs generated. At least one of the digital media recordings 1129 may correspond to live broadcasts of digital media content. At operation 1109, digital media recordings 1129 stored in the storage device are retrieved. A retrieved digital media recording 1129 may be transmitted to a client machined upon request at operation 1111.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A system comprising:
a processor;
a storage device;
Random Access Memory (RAM);
an archive writer configured to retrieve metadata in RAM and write the metadata into an archive container file in RAM using an archive container file format (AR), the archive container file corresponding to a singular file when complete,
  wherein the archive writer is further configured to append new metadata retrieved from RAM into the archive container file if the new metadata also corresponds to the singular file; and
a recording writer configured to flush the archive container file to be stored as a first file on the storage device once all metadata corresponding to the singular file have been appended by the archive writer to the archive container file to complete the singular file.

2. The system of claim 1, wherein the system further comprises one or more recording servers, each recording server being configured to retrieve the first file stored in the storage device.

3. The system of claim 2, wherein each recording server is configured to transmit at least a portion of the first file a client machine upon request.

4. The system of claim 1, wherein the metadata corresponds to 6 to 10 seconds of the singular file.

5. The system of claim 1, wherein the format of the archive container file is an AR archive format.

6. The system of claim 1, wherein the metadata is generated using live streaming segmenters.

7. The system of claim 1, wherein the first file corresponds to live broadcasts of digital media content.

8. A method for recording multimedia files, the method comprising:
retrieving first metadata in RAM;
writing the first metadata into an archive container file in RAM using an archive container file format (AR), the archive container file corresponding to a singular file when complete;
appending second metadata retrieved from RAM into the archive container file based on determining that the second metadata also corresponds to the singular file;
flushing the archive container file to be stored as a first file on a storage device once all metadata corresponding to the singular file have been appended by an archive writer to the archive container file to complete the singular file.

9. The method of claim 8, further comprising retrieving the first file stored in the storage device.

10. The method of claim 9, further comprising transmitting at least a portion of the first file to a client machine upon request.

11. The method of claim 8, wherein each of the first metadata and the second metadata corresponds to 6 to 10 seconds of the singular file.

12. The method of claim 8, wherein the format of the archive container file is an AR archive format.

13. The method of claim 8, wherein the first metadata is generated using live streaming segmenters.

14. The method of claim 8, wherein the first file corresponds to live broadcasts of digital media content.

15. A non-transitory computer readable medium storing one or more programs configured for execution by a computer, the one or more programs comprising instructions for:
   retrieving first metadata in RAM;
   writing the first metadata into an archive container file in RAM using an archive container file format (AR), the archive container file corresponding to a singular file when complete;
   appending second metadata retrieved from RAM into the archive container file based on determining that the second metadata also corresponds to the singular file;
   flushing the archive container file to be stored as a first file on a storage device once all metadata corresponding to the singular file have been appended by an archive writer to the archive container file to complete the singular file.

16. The non-transitory computer readable medium of claim 15, wherein the instructions further comprise:
   retrieving the first file stored in the storage device.

17. The non-transitory computer readable medium of claim 16, wherein the instructions further comprise:
   transmitting at least a portion of the first file to a client machine upon request.

18. The non-transitory computer readable medium of claim 15, wherein each of the first metadata and the second metadata corresponds to 6 to 10 seconds of the singular file.

19. The non-transitory computer readable medium of claim 15, wherein the format of the archive container file is an AR archive format.

20. The non-transitory computer readable medium of claim 15, wherein the first metadata is generated using live streaming segmenters.

* * * * *